3,520,858
POLYMERIZATION PROCESS

Stephen John Bodnar, Beaumont, and Chuck Linwell McHargue and Larn Carnell Anglin, Jr., Nederland, Tex., assignors to Texas-U.S. Chemical Company, Parsippany, N.J., a corporation of Delaware
No Drawing. Filed Sept. 6, 1967, Ser. No. 665,720
Int. Cl. C08d *3/06;* C08f *19/08*
U.S. Cl. 260—83.7                                      12 Claims

ABSTRACT OF THE DISCLOSURE

A polymerization process for homopolymerizing and copolymerizing diene monomers in solvent solution utilizing an organolithium polymerization catalyst to produce polymeric materials which can be vulcanized to form synthetic rubbery materials.

BACKGROUND OF THE DISCLOSURE

Solution homopolymerization and copolymerization of diene monomers in solvent solution in the presence of an organolithium catalyst has been proposed. The solvent solutions for copolymerizing with this catalyst also contain a polar compound, e.g., an ether, a thioether, or a non-aromatic heterocyclic tertiary amine to produce random copolymers and to control the structure of said copolymers. This process has been found to suffer from a number of disadvantages. The characteristics of the product polymer sometimes vary in erratic fashion. This has been attributed to the high sensitivity of this catalyst to impurities in the solvent, in the catalyst, or in one of the feed materials. It has also been found that with this catalyst, "gel-like" material having polymeric characteristics is formed in the reactors. This material must be removed periodically, requiring costly shut-downs in the operation. The process also suffers from the disadvantage that control of the viscosity and the molecular weight of the product polymer is attained only by variation of the catalyst concentration. The preparation of polymers having low Mooney viscosity requires the use of high levels of the expensive organolithium catalyst.

SUMMARY OF THE INVENTION

It has now been discovered that the conjoint addition to the polymerization mixture of a small but significant amount of hydrogen together with an organolithium catalyst improves the polymerization process in several important respects. The amount of hydrogen added is between about 0.001 and 1.0, and preferably between 0.003 and 0.1 standard cubic feet of hydrogen per pound of polymer produced. A "standard" cubic foot of gas is that measured at 32° F. and 29.92 inches of mercury. The amount of organolithium catalyst used is between 0.01 and 2.0, and preferably between 0.08 and 0.11, part of catalyst per 100 parts of total monomers charged to the polymerization mixture.

It has been found that the formation of the gel-like polymer in the reactor equipment is minimized by the addition of hydrogen. It has also been found that the hydrogen addition permits a large reduction, e.g., 40–50%, in the amount of the catalyst required to prepare polymers having a specified Mooney viscosity level. It has further been discovered that variations in the amount of hydrogen added will have the same general effect as a like variation in the amount of catalyst used. An increase in the amount of hydrogen added will decrease the Mooney viscosity of the polymer produced, and a decrease in the amount of hydrogen added will increase the Mooney viscosity of the product polymer. This process provides a useful method for controlling the polymerization and to produce polymers of more consistent properties.

DESCRIPTION OF THE PREFERRED EMBODIMENTS

The process of the present invention is particularly applicable to the solution homopolymerization and copolymerization of butadiene and other dienes such as 2-methyl butadiene-1,3 (isoprene) and 2,4-dimethyl pentadiene-1,3. The dienes may be copolymerized with another diene, or a vinyl-substituted aromatic hydrocarbon such as styrene, divinylbenzene, vinyltoluene, or vinylnaphthalene. These comonomers may be utilized in a very broad ratio. Commonly at least 5% of a given monomer is required to noticeably affect the copolymers' properties. Accordingly they are used in a weight ratio range of from 5 to 95, to 95 to 5.

The organolithium polymerization catalysts correspond to the general formula $R(Li)_x$, wherein R is an aliphatic cycloaliphatic, or aromatic radical containing 1 to 20 carbon atoms, and $x$ is an integer from 1 to 4 inclusive. The R group has a valence equal to the integer $x$ and is preferably an alkyl radical containing 1 to 8 carbon atoms, a cycloalkyl radical containing 5 or 6 carbon atoms, or a phenyl radical. Examples of such preferred catalysts include methyllithium, isopropyllithium, n-butyllithium, phenyllithium, 1,4-dilithiobutane, and cyclohexyllithium. The broad range of organolithium catalysts include tert-octyllithium, n-decyllithium, 4-butylphenyllithium, p-tolyllithium, 4-cyclohexylbutyllithium, dilithiomethane, 1,10-dilithiodecane, 1,4-dilithioyclohexane, 1,4-dilithiobutene-2, 1,4-dilithiobenzene, 1,2-dilithio-1,2-diphenylethane, etc.

The homopolymerization is carried out in an inert hydrocarbon solvent. Copolymerization is carried out in a solvent mixture containing an inert hydrocarbon solvent and a polar solvent. The hydrocarbon solvent may be an aromatic hydrocarbon, a paraffin, or a cycloparaffin. Preferred solvents include propane, isobutane, n-pentane, isoctane, n-hexane, cyclohexane, benzene, toluene, and xylene. Other useful hydrocarbon solvents includes n-dodecane, cyclopentane, methylcyclopentane, dimethylcyclopentane, ethylcyclohexane, ethylbenzene, naphthalene, etc.

The useful polar solvents include dimethyl ether, diethyl ether, tetrahydrofuran, diethyl sulfide, dimethyl sulfide, dioxane, and N-methylmorpholene. Although relatively large amounts of the polar solvents may be used, they are also effective in small amounts. As little as 0.005 part by volume of polar solvent per 100 parts by volume (0.005 volume percent) of the hydrocarbon solvent have been found to be effective. Mixtures containing as much as 50 parts by volume of the polar solvent per 100 parts by volume (33.33 volume percent) of the hydrocarbon solvent have also been found to be effective. The preferred range is between 0.05 and 1 part by volume (0.05 to 1 volume percent) of the polar solvent per 100 parts by volume of the hydrocarbon solvent.

The polymerization process may be carried out over a wide range of temperatures, with the starting temperature from about —80° C. to 300° C. The preferred starting temperature range is from —20° C. to 150° C. The temperature rises during polymerization but is preferably maintained below 300° C. The polymerization reaction is preferably carried out at pressures sufficient to maintain the monomeric materials in the liquid state. The specific pressure utilized is dependent upon the monomers being polymerized, the solvent mixture utilized, and the polymerization temperature. The polymerization pressure may be autogenously derived or may be built up by the addition of a gas which is inert with respect to the polymerization reaction.

The reaction may be carried out as a batch process by charging the reactants into a suitable reactor and adding the catalyst and passing the desired amount of hydrogen through the reactor. The process may be carried out in a continuous manner by maintaining the specified quantities of reactants in a reactor for suitable residence time. The residence time may be varied between very wide limits depending upon the reaction conditions and solvents utilized, and the polymer product characteristics desired. The preferred residence time is from 40 to 60 minutes. The polymerization reaction is short-stopped at the end of the desired reaction period by the addition of a short-stopping agent which inactivates the catalyst. The preferred short-stopping agents are water, alcohol or acids. These include alcohols such as ethyl alcohol, isopropyl alcohol, and organic and inorganic acids. It has also been found advantageous to add an anti-oxidant to the polymer mixture just prior to the addition of the short-stopping agent. The anti-oxidant may be any of the many anti-oxidants or stabilizers for rubbers disclosed in the literature, such as the thiobisphenols, the alkylated phenyl phosphites, etc.

After the reaction is short-stopped, the polymer may be separated from the solvent by addition of a precipitation agent causing the polymer to precipitate, or by removal of the solvent from the polymer, e.g., by steam stripping the solvent. Low molecular weight alcohols, such as methyl, ethyl and isopropyl alcohols have been found to be efficient precipitant for the polymer. These alcohols can also be used as the short-stopping agent. Larger amounts of alcohol are necessary to precipitate the polymer than are necessary to short-stop the reaction. The reaction may be short-stopped and the polymer precipitated in a single step by addition of a large amount of alcohol. The steam stripping of the solvent to recover the polymer and solvent is preferred in the practice of a continuous process. Following steam stripping, the polymer is dewatered and dried in the conventional manner.

The polymers produced in accordance with the process of this invention may be either rubbery solid or liquid, dependent upon their molecular weight. In the vulcanized state they are elastomeric materials. These polymers may be worked in conventional fashion on rubber working machinery. They may also be compounded with standard compounding ingredients such as oil extenders, fillers, including carbon black and silica, activators, accelerators, curing agents, anti-oxidants, pigments, etc.

The process of the present invention is further illustrated by the following examples in which all parts are by weight except when otherwise noted.

A butadiene-styrene copolymer was prepared by adding to a reactor, butadiene, styrene, hexane and tetrahydrofuran which were premixed in the proportions shown in the table by bringing them together in a feed line to the reactor. A 7.5% solution of n-butyllithium in hexane was added to the same feed line and thereby added to the mixture at a point prior to the entry of the feed line into the reactor. The rate of hydrogen addition was calculated to give the reported standard cubic feet per pound of polymer. The hydrogen values reported in the following table are "standard" cubic feet. The rate of addition of the butyllithium in hexane was calculated to give the catalyst dosage reported in the table. The hydrogen was also fed into this same feed line immediately before the feed line entered the reactor. The average residence time in the reactor was 60 minutes. Upon leaving the reactor, a 25% solution of a thiobisphenol antioxidant (equivalent to one part of anti-oxidant per 100 parts of polymer) was added to the polymerization mixture. Water, in the amounts shown in the table, was also added at this point to short-stop the reaction. The polymer was separated from the solvent by steam stripping, and the resulting polymer crumb was dewatered and dried. The six examples include three comparative examples, No. 1, No. 3 and No. 5, which contain relatively larger amounts of the butyllithium catalyst and which were produced without the hydrogen addition. Example Nos. 2, 4 and 6 are illustrative of the process of the present invention.

TABLE

| Example | 1 | 2 | 3 | 4 | 5 | 6 |
|---|---|---|---|---|---|---|
| Hexane (lbs./hr.) | 500 | 600 | 600 | 600 | 600 | 600 |
| Butadiene (lbs./hr.) | 77 | 77 | 77 | 77 | 90 | 90 |
| Styrene (lbs./hr.) | 23 | 23 | 23 | 23 | 10 | 10 |
| Tetrahydrofuran (vol. percent) | 0.05 | 0.05 | 0.05 | 0.05 | 0.05 | 0.05 |
| Butyllithium (lbs./100 lbs. of monomer) | 0.173 | 0.09 | 0.150 | 0.09 | 0.152 | 0.11 |
| Hydrogen (cu. ft. per lb. of estimated polymer) | | 0.009 | | 0.003 | | 0.005 |
| Temperature (° F.): | | | | | | |
| Feed | 122 | 128 | 128 | 127 | 135 | 125 |
| Reactor | 237 | 243 | 252 | 152 | 249 | 152 |
| Antioxidant | 1 | 1 | 1 | 1 | 1 | 1 |
| Shortstop | 3.8 | 3.8 | 3.8 | 3.8 | 3.8 | 3.8 |
| Percent solids | 15.3 | 13.6 | 14.3 | 13.9 | 14.0 | 13.8 |
| Percent conversion | 92 | 95.1 | 100 | 97.2 | 97.9 | 96.5 |
| Mooney viscosity (ML-4 at 212° F.) | 53 | 47 | 97 | 98 | 104 | 101 |
| Bound styrene (percent) | 25 | 23 | 23 | 23 | 10 | 10 |
| Microstructure (percent): | | | | | | |
| Trans | 57 | 53 | 53 | 55 | 52 | 54 |
| Vinyl | 15 | 16 | 16 | 17 | 16 | 14 |
| Cis | 28 | 31 | 31 | 28 | 32 | 32 |

It can readily be seen from a comparison of the data for Examples 2, 4 and 6 with that of Examples 1, 3 and 5, that the use of hydrogen in conjunction with organolithium catalyst provides a significant improvement in catalyst efficiency. In addition, the process of this invention permits greater control over the polymerization process, facilitates adjustments in the reaction and reduces the gel build-up.

Polybutadiene produced under the exemplified process, using hydrogen, enjoys the enumerated benefits.

Similar advantageous polymerizations are obtained using hydrogen in conjunction with other of the organolithium catalysts, such as methyllithium, phenyllithium, cyclohexyllithium, and 1,4-dilithiobutane. In such polymerizations, butadiene or one of the other dienes may be homopolymerized or copolymerized with comonomers, such as, divinylbenzene, vinyltoluene, and vinylnaphthalene. Obviously other solvents and short-stopping agents such as those described hereinbefore may be used in place of the exemplified hexane-tetrahydrofuran solvent mixture, and the exemplified water short-stopping agent.

As many embodiments of this invention may be made without departing from the spirit and scope thereof, it is to be understood that the invention includes all such modifications and variations as come within the scope of the appended claims.

What is claimed is:

1. A solvent diene polymerization process wherein at least one diene selected from the group consisting of butadiene, isoprene, and 2,4-dimethylpentadiene is polymerized in an inert hydrocarbon solvent at a temperature between —80° and 300° C., in the presence of a catalyst system consisting essentially of
    (a) between 0.01 and 2 parts of an organolithium compound per 100 parts of monomer, said organolithium compound having the formula $R(Li)_x$, wherein R is a hydrocarbon radical selected from the group consisting of aliphatic, cycloaliphatic, and aromatic radicals containing 1 to 20 carbon atoms, and $x$ is an integer from 1 to 4 inclusive, and
    (b) between 0.003 and 1 standard cubic foot of hydrogen per pound of polymer produced, and recovering the polymer product of said polymerization.

2. The process of claim 1 wherein said inert solvent is at least one compound selected from the group consisting of propane, isobutane n-pentane, isoctane, n-hexane, cyclohexane, benzene, toluene, xylene, n-dodecane, cyclopentane, methylcyclopentane, dimethylcyclopentane, ethylcyclohexane, ethylbenzene, and naphthalene; wherein said polymerization is carried out at a temperature between −20° C. and 300° C.; wherein $x$ is 1 or 2, and R is an alkyl radical containing 1 to 8 carbon atoms, a cycloalkyl radical containing 5 or 6 carbon atoms, or a phenyl radical; wherein the amount of said organolithium compound is between about 0.08 and 0.11 part per 100 parts of monomer; and wherein the amount of said hydrogen is between 0.003 and 0.1 standard cubic foot of hydrogen per pound of polymer produced.

3. The process of claim 2 wherein said diene is butadiene, and wherein the temperature of said butadiene feed is between −20° C. and 150° C.

4. The process of claim 3 wherein said inert solvent is hexane, and wherein R is an alkyl radical.

5. The process of claim 4 wherein said organolithium compound is butyllithium.

6. The process of claim 1 wherein at least one diene in copolymerized with a comonomer selected from the group consisting of one of said dienes, styrene, divinylbenzene, vinyltoluene and vinylnaphthalene; and wherein said solvent also contains between 0.005 and 50 parts by volume of a polar solvent selected from the group consisting of ethers, thioethers, and non-aromatic heterocyclic tertiary amines, per 100 parts by volume of said inert hydrocarbon solvent.

7. The process of claim 6 wherein said inert solvent is at least one compound selected from the group consisting of propane, isobutane n-pentane, isoctane, n-hexane, cyclohexane, benzene, toluene, xylene, n-dodecane, cyclopentane, methylcyclopentane, dimethylcyclopentane, ethylcyclohexane, ethylbenzene, and naphthalene; wherein said polymerization is carried out at a temperature between −20° C. and 300° C.; wherein $x$ is 1 or 2, and R is an alkyl radical containing 1 to 8 carbon atoms, a cycloalkyl radical containing 5 or 6 carbon atoms, or a phenyl radical; wherein the amount of said organolithium compound is between about 0.08 and 0.11 part per 100 parts of monomer; and wherein the amount of said hydrogen is between 0.003 and 0.1 standard cubic foot of hydrogen per pound of polymer produced.

8. The process of claim 7 wherein said solvent consists of between 0.05 and 1 part by volume of said polar solvent per 100 parts by volume of said inert hydrocarbon solvent; and wherein the temperature of the feed monomer is between −20° C. and 150° C.

9. The process of claim 7 wherein butadiene is copolymerized with styrene.

10. The process of claim 9 wherein said polar solvent is at least 1 solvent selected from the group consisting of dimethyl ether, diethyl ether, tetrahydrofuran, diethyl sulfide, dimethyl sulfide, dioxide, and N-methylmorpholene.

11. The process of claim 10 wherein said inert solvent is hexane and said polar solvent is tetrahydrofuran; and wherein R is an alkyl radical.

12. The process of claim 11 wherein said organolithium compound is butyllithium.

References Cited

UNITED STATES PATENTS

| | | |
|---|---|---|
| 3,058,973 | 10/1962 | Greenwell. |
| 3,306,949 | 2/1967 | Mertzweiller et al. |
| 3,317,918 | 5/1967 | Foster. |
| 3,352,934 | 11/1967 | House et al. |

JAMES A. SEIDLECK, Primary Examiner

U.S. Cl. X.R.

260—82.1, 94.2